United States Patent [19]
Kujawa

[11] Patent Number: 5,904,620
[45] Date of Patent: May 18, 1999

[54] APPARATUS AND METHOD FOR PLAYING COMPUTER GAMES VIA A TELECOMMUNICATION NETWORK

[75] Inventor: Kim Kujawa, Saskatchewan, Canada

[73] Assignee: Sasktel, Regina, Canada

[21] Appl. No.: 08/809,320

[22] PCT Filed: Sep. 28, 1995

[86] PCT No.: PCT/CA95/00547

§ 371 Date: Mar. 19, 1997

§ 102(e) Date: Mar. 19, 1997

[87] PCT Pub. No.: WO96/10450

PCT Pub. Date: Apr. 11, 1996

[30] Foreign Application Priority Data

Sep. 30, 1994 [CA] Canada ................................. 2133384

[51] Int. Cl.⁶ ........................................................ A63F 9/22
[52] U.S. Cl. ............................................................... 463/41
[58] Field of Search .................................. 463/40, 41, 42; 370/494; 340/531; 379/47, 93.14, 106.03

[56] References Cited

U.S. PATENT DOCUMENTS 3,937,889  2/1976  Bell, III et al. ..................... 179/2 DP
5,236,199  8/1993  Thompson, Jr. ......................... 463/41
5,292,125  3/1994  Hochstein et al. ....................... 463/41
5,636,209  6/1997  Perlman ............................... 463/42 X

FOREIGN PATENT DOCUMENTS 0 139 405 A2  5/1985  European Pat. Off. ....... H04M 11/06
33 16 804 A1  11/1983  Germany ......................... A63F 9/22
06 246067  9/1994  Japan ............................... A63F 9/22
233429  4/1990  New Zealand .
WO 91/06160  5/1991  WIPO ............................ H04H 1/02

OTHER PUBLICATIONS

Patent Abstracts of Japan, vol. 18, No. 634, Dec. 2, 1994 (Abstract of Japanese Patent No. JP 06 246067 published Sep. 6, 1994).

Primary Examiner—Michael O'Neill
Attorney, Agent, or Firm—Rodney F. Brown

[57] ABSTRACT

An apparatus for networking computer games in a centrally located game storage accessed by remote game key pads comprising a keypad interface for receiving game control data from the key pad, the game control data being frequency modulated with a center frequency above the audible frequency range to obtain a modulated data format and means for connecting the keypad interface in parallel across a telephone pair for communicating the modulated data format to a switched telephone network and a method for using such apparatus.

19 Claims, 10 Drawing Sheets

APPARATUS AND METHOD FOR PLAYING COMPUTER GAMES VIA A TELECOMMUNICATION NETWORK

BACKGROUND OF THE INVENTION

1. Field of the Invention

This invention relates to an apparatus for networking computer games in a centrally located game storage accessed by a remote game pad.

2. Background

There is a need for providing users such as hotel guests with improved access to computer games such as that known under the trademark Nintendo that are in a centrally located game storage. What is required is a system which permits a hotel guest to request connection by calling the front desk or by using a computerized order entering system. If a Gateway is available the guests game controller is connected to that Gateway through an analog switch and the guest's television is tuned to the channel that the Gateway modulator is tuned to. The guest's game controller is now connected to the Gateway and the guest is prompted by the Gateway to select a particular game to play. Games are stored in a game storage personal computer and selected using the game controller.

It is an object of the present invention to provide an apparatus for interfacing a computer game keypad with a remote game storage over a telephone network using a data-over-voice system.

It is another object of the present invention to provide a system for networking computer games by accessing a central game storage with a plurality of remote keypads so as to enable players to communicate game control data to a game storage over an existing local telephone network, and to receive the requested game images on a television set.

Still another object of this invention is to provide a system for networking computer games which administers and allocates a plurality of gateways according to their state of occupancy, establishes an access path and supervises the communication of game control data from a remote game keypad to a central game storage along the access path, and supervises the transfer of the corresponding game images from the game storage to a television set associated with the keypad which has requested the images.

SUMMARY OF THE INVENTION

According to one aspect of the present invention, there is provided an apparatus for networking computer games in a centrally located game storage accessed by a remote game keypad comprising: a keypad interface for receiving game control data from a keypad, the game control data being frequency modulated with a center frequency above the audible frequency range to obtain a modulated data format; and means for connecting the keypad interface in parallel across a telephone pair for communicating the modulated data format to a switched telephone network.

According to another aspect of the invention, there is provided a system for networking computer games in a centrally located game storage accessed by a plurality of remote game keypads comprising: a plurality of keypad interfaces each for receiving game control data from an associated keypad, frequency modulating the game control data with a center frequency above the audible frequency range to obtain a modulated data format and communicating the modulated data format over a switched telephone network; means for receiving the modulated data format over the telephone network, routing the modulated data format along an access path, and extracting the game control data therefrom; a central game storage for supplying a game image signal over a television cable network to remote television sets; and a plurality of centrally located gateways for receiving the game control data and accordingly transferring game image signals from the game storage over the television cable network.

A method for networking computer game controllers with a centrally located game storage is also provided, comprising the steps of: reading game control data generated by each of the keypads and encoding the game control data to a serial data format; modulating the serial data format with a center frequency above the audible range to obtain a modulated data format; amplifying the modulated data format and communicating the modulated data format over a switched telephone network; establishing an access path for the modulated data format; routing the data format along the access path; interrogating the plurality of gateways for determining an available gateway; and demodulating the modulated date format and communicating the game control data to the available gateway.

The apparatus of the present invention may be advantageously used in hotels to provide the guests with the option of playing a variety of games such as those known under the trademark Nintendo on a television set or a display provided in the room. Generally, a hotel room is provided with a telephone set connected to the local telephone network through a telephone outlet, and with a television set connected to a local television cable network. The guest can play a computer game using a keypad which is connected to the local telephone network in parallel with the telephone line of that room. As well, a plurality of keypads may be connected over the telephone line in the same room, if the game permits more than one player. The player employs standard game control devices to input game control data on the keypad, this data is modulated to a data format adapted to be sent over a local telephone network and routed to a centrally located gateway. The gateway communicates the control data to a central game storage and transfers the requested game images from the storage to the television set of player's or players' room, or the local television cable.

The existing local telephone and television cable networks may also be used for allowing players in different hotel rooms to access a central game storage so that a plurality of computer games may be played simultaneously. In this case, a plurality of gateways serve the hotel rooms and the system allocates an unoccupied gateway to the current game request. An access path is established by a central switch, and the gateway in this access path transfers the game data between the central game storage and the respective keypad. The game control data is transferred by the gateway through the central switch to the central game storage. The image signal corresponding to this control data is transferred via the local television cable network to the room where the game control data was issued.

Once an access path has been established, the players may communicate with the game storage to select and play a game which is available in the game storage. Another advantage of the present invention is that the normal use of the telephone network is not affected by the transmission of the game control data. This is achieved by formatting the game control data so as to be transmitted at frequencies higher than the voice spectrum.

BRIEF DESCRIPTION OF THE DRAWINGS

The invention will be further understood from the following description with reference to the accompanying drawings, in which:

FIG. 5b schematically illustrates the circuitry of an exemplary embodiment of FIG. 5a;

FIG. 7b schematically illustrates circuitry of an exemplary embodiment of the filter and FSK demodulator of FIG. 7a.

DETAILED DESCRIPTION OF THE PREFERRED EMBODIMENT

Figure 1:
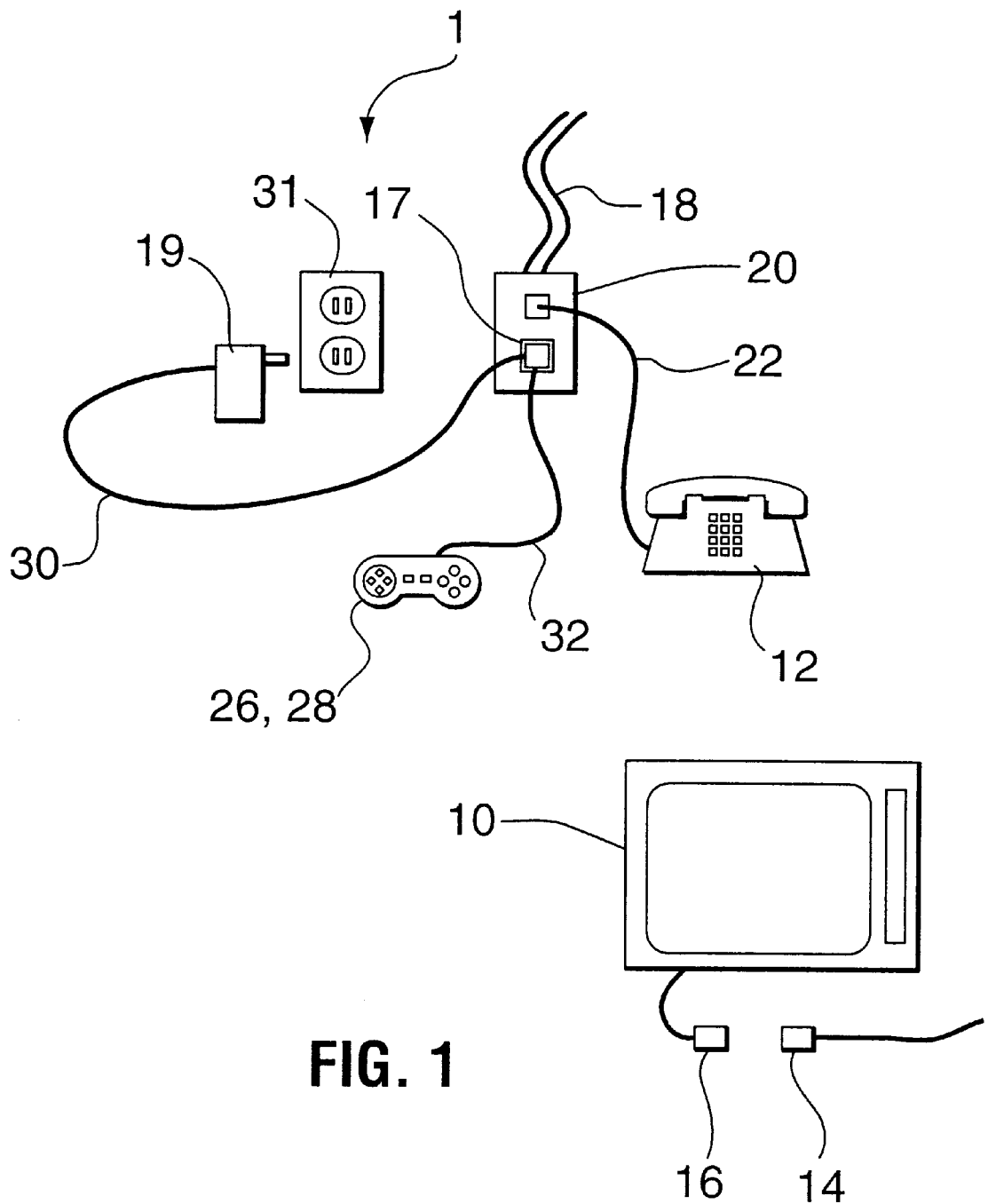
FIG. 1 illustrates a game user interface equipment and connection thereto in accordance with an embodiment of the present invention.

FIG. 1 illustrates the connection of a game keypad, provided with a keypad interface to the outlets of a telephone and a television cable network generally available in a hotel room. The room, generally designated by reference numeral 1, is provided with a television set 10 and a telephone set 12. The television set 10 is connected to the local television cable outlet 14 by cable 16. Both the regular television programs and computer game information may be received on cable 14, as requested by the guest.

The telephone set 12 is connected to the telephone pair 18 through cable 22 which is inserted in telephone outlet 20. The telephone pair 18 is part of the local telephone network 24 illustrated in FIG. 2.

Figure 2:
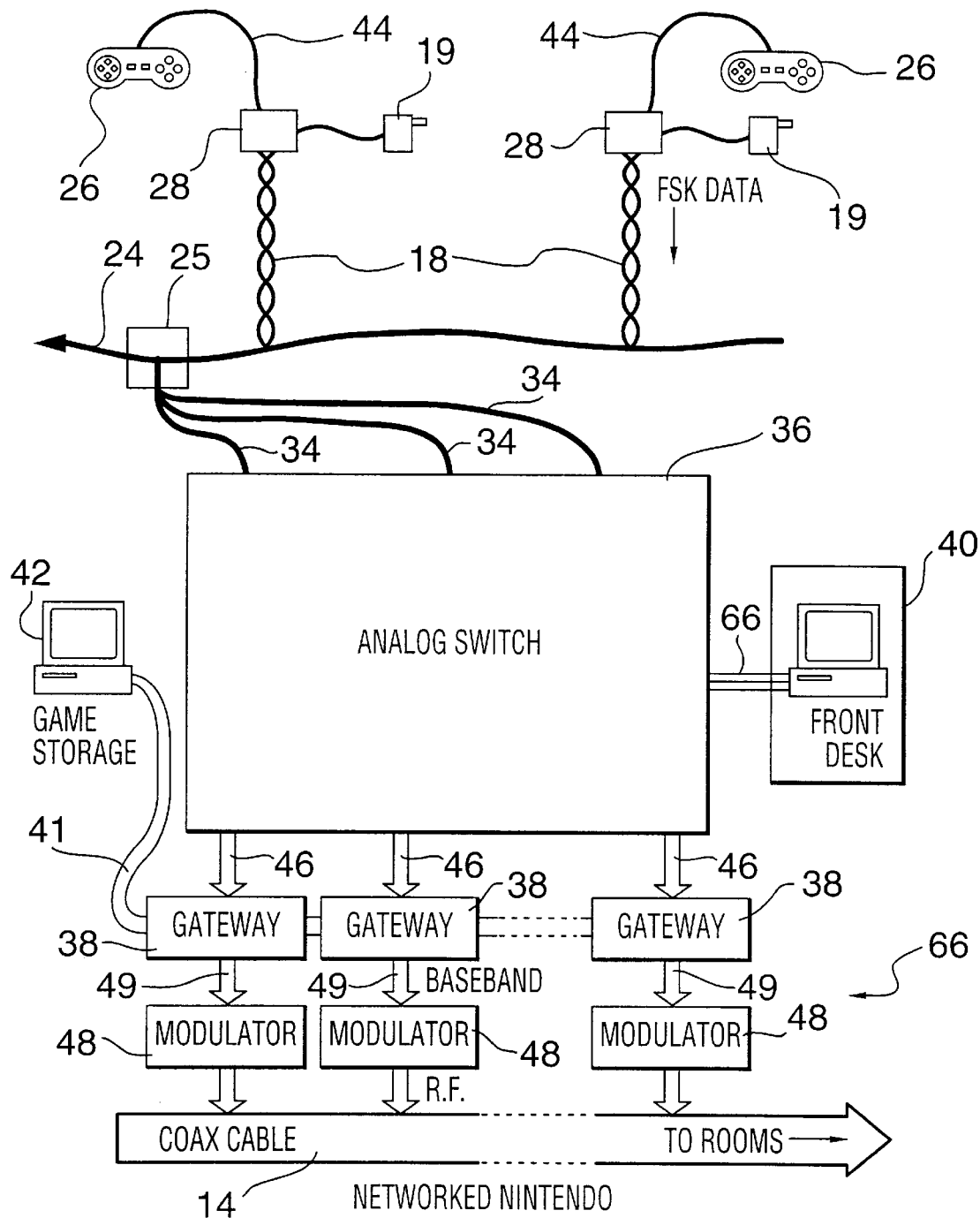
FIG. 2 illustrates a system for networking computer game equipment in accordance with an embodiment of the present invention.
Figure 3A:
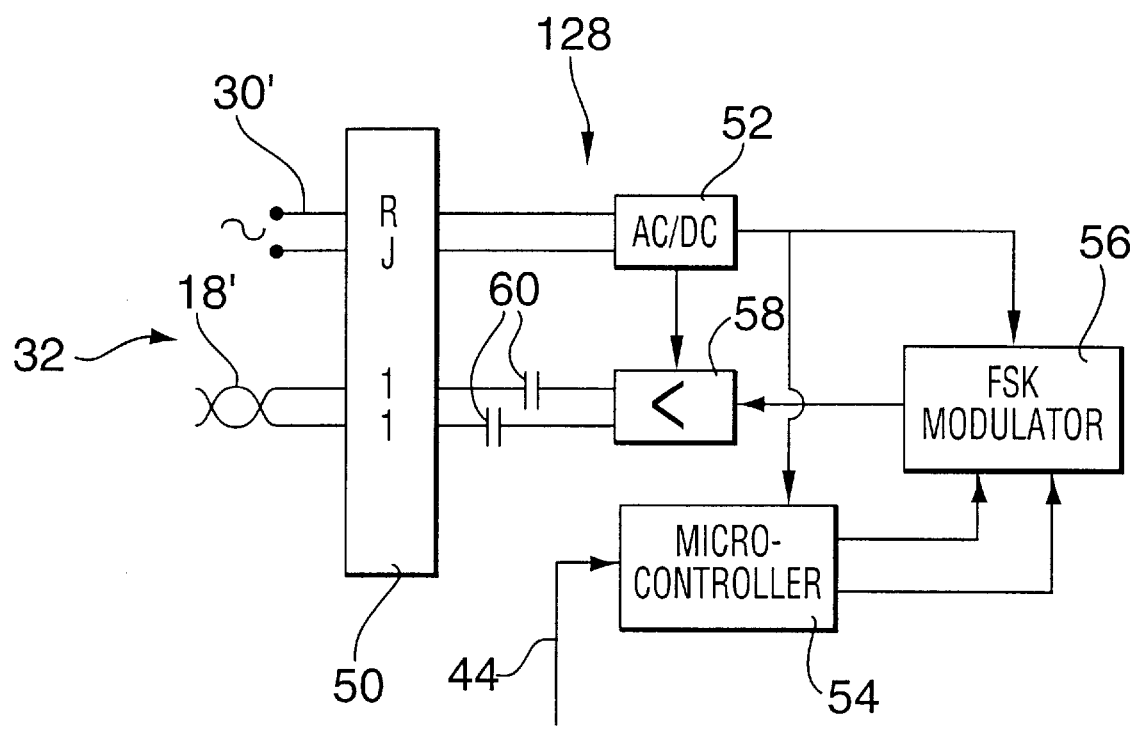
FIG. 3a is the block diagram of a keypad interface according to a preferred embodiment of the present invention.
Figure 3B:
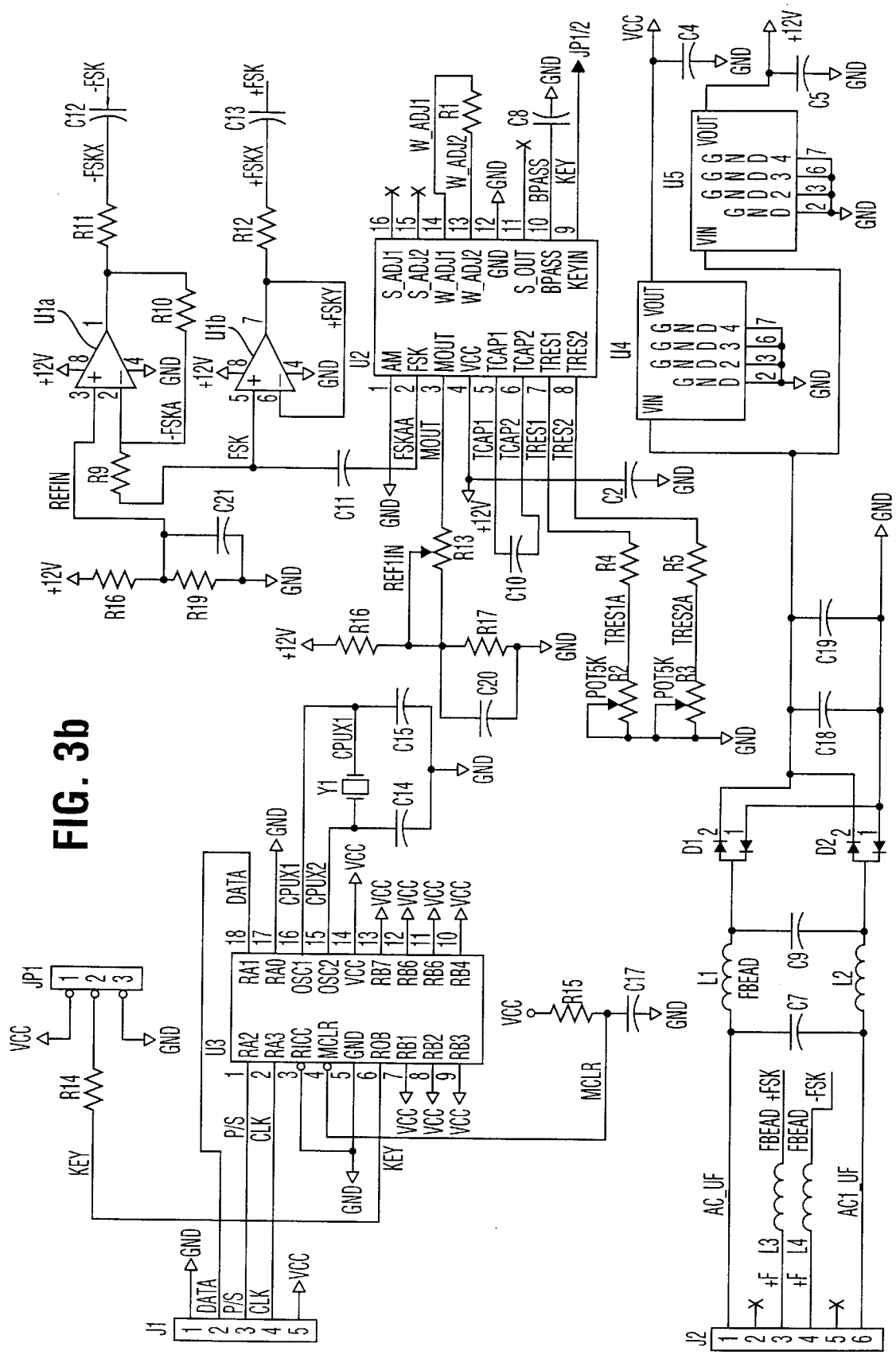
FIG. 3b is the circuit diagram of the keypad interface according to a preferred embodiment of the present invention.

A keypad interface 28, shown separate from the keypad 26 in FIG. 2 and illustrated in more detail in FIGS. 3a and 3b, is provided with each keypad 26. The interface 28 receives the game control data input on the respective keypad 26 and converts this control data into a modulated data format. Power/signalling cable 32 includes a power pair 30' for connection to power cable 30, and a signal pair 18' for connection to telephone line 18. The modulated data format is sent from interface 28 over the respective power/signalling cable 32 and further over the telephone pair 18 into the local telephone network 24. To this end, power/signalling cable 32 is inserted in the outlet 20, or connected in any other way in parallel with cable 22. Each keypad interface 28 is in addition provided with an AC power supply 19 and, a supply cable 30 for connection of the circuits of interface 28 to an AC outlet 31 normally provided in each room. The telephone outlet 20 includes a standard RJ-11 4-pin connector for the telephone cable 22, and a second connector 17, a 6-pin connector, for connecting the power supply cable 30 to the keypad interface 28 via the power pair 30' of the power/signalling cable 32 and for connecting two signal lines 18' from the keypad interface 28 to the telephone pair 18.

Game keypad 26 could be any type of keypad currently in use for playing computer games. It is also possible to have as many keypads in a room as may be required by the game. The keypad 26 and the interface 28 are illustrated as separate units in FIG. 2 for clarity. The interface 28 and the keypad 26 are preferably arranged in the same housing as illustrated in FIG. 1.

FIG. 2 illustrates the block diagram of the system for networking computer games according to an embodiment of the present invention. A plurality of game keypads 26, each provided with the respective keypad interface 28 are connected as disclosed in FIG. 1 to the local telephone network 24. The local network 24 includes a plurality of 25-pair cables in a wiring closet 25. At the wiring closet 25 a like plurality of 25-pair cables 34 are tapped off and routed to a central switch 36. The number of cables 34 depends on the number of rooms in the hotel.

The central switch 36 includes a plurality of outputs connected via busses 46 to a plurality of gateways 38 and an input connector via a cable 66 to an order entry system 40. A bus 41 connects a game storage 42 to gateways 38. Each gateway 38 is connected to a modulator 48 via a bus 49. Modulators 48 are connected to the cable distribution system represented by a coax cable 14.

In operation a keypad 26 communicates with a gateway 38 using a data-over-voice system, such that the normal telephone operation is not disturbed. The keypad is scanned and the keystrokes are converted to asynchronous data bytes. These are sent to the controller interface 28 over a data cable 44. The interface 28 modulates the data bytes to a modulated data format, at frequencies above 20 kHz and preferably around 30 kHz using frequency switched key modulation (FSK), so that normal telephone operation is not affected. The modulated data format is thereafter sent over the telephone pair 18 and is tapped off by the telephone network 24 at the wiring closet 25 and routed to the central switch 36.

The central switch 36 then connects the keypad interface 28 with an available gateway 38, under the supervision of the order entry system 40. In addition, the central switch 36 demodulates the modulated data format to extract the game control data. The data extracted from the modulated data format in the central switch 36 is fed to the respective available gateway 38 over the corresponding bus 46.

The gateway 38 communicates the game control data to the game storage 42, extracts the game image signals requested by the keypad 26 and sends the game image signals to an associated modulator 48.

The gateways are administered by the order entry system 40. This system determines an available gateway 38 which is not involved in any data transfer with the game storage and allocates the available gateway to the keypad that has issued the request under consideration. This operation may be effected by a receptionist at the front desk, who has an updated list with the gateways allocation. Upon determining the available gateway which may be allocated to the current game request, the operator turns on an analog switch in the central switch 36 by sending a control signal over line 66, to connect this available gateway to the keypad in question.

In the case of hotels with a large number of rooms, an automated system may be used as the order entry system 40. Such an automated system would continuously interrogate the gateways 38 to determine which one is currently available and would switch on the corresponding analog switch of the central switch 36 to establish the access path between the keypad(s) of the room under consideration and the allocated gateway. When the game is terminated, the entry order system 40 would automatically switch off the access path and would de-allocate the gateway by sending again a control signal over line 66.

The game storage 42 supplies the games requested by the game control data received from the keypads over the gateways. The game storage 42 is accessed over the bus 41 between the respective gateway 38 and the game storage 42. Game image signals are retrieved from the game storage 42 and sent to an associated modulator 48 over a corresponding bus 49.

Each modulator 48 is tuned on a television channel so as to transmit the game information only to the player whose television is tuned to that channel. The game image signal is routed then to the room television set over the coaxial cable 14 to the television set of the room with the keypad that has issued the game control data under consideration, which has already been tuned on this channel.

The block diagram of the keypad interface 28 is illustrated in FIG. 3a and an example of the circuit diagram is shown in FIG. 3b.

The keypad interface 28 includes an RJ-11 telephone sack 50, an AC/DC convertor and voltage regulator 52, a microcontrolier 54, an FSK modulator 56, an amplifier 58 and coupling capacitors 60. Four lines come into the interface 28 via power/signalling cable 32—two for the signalling line 18' and two for the power supply cable 30' and are connected through the standard 6 pin RJ11 teiephone jack 50. Two pins of the telephone jack 50 connect with the power supply cable 30', providing 16 Volt AC and are connected to the voltage regulator 52. The voltage regulator circuitry 52 provides DC power to the keypad interface components. The microcontroiier 54 is connected to the game keypad 26 by the data cable 44 and to the FSK modulator 56. The output of the FSK modulator 56 is applied as input to the amplifier 58. The output of the amplifier 58 is capacitively coupled by coupling capacitors 60 to two pins of the telephone jack 50 for connection to the signalling line 18' of power/signalling cable 32.

In operation, the micro-controller 54 reads the game keypad 26 at approximately 20 ms intervals and encodes the ASCII serial data for error correction at the receive site. FSK modulator 55 modulates the ASCII serial data at its input with frequencies around a 30 kHz centre frequency, to place the resulting modulated data format above the audible frequency range. This signal is fed to the amplifier 58 and this boosted signal is capacitively coupled by means of a capacitive coupling 60 to the signalling lines 18' of power/ signalling cable 32. The capacitive coupling 60 allows the high frequency signal to couple onto the line, while completely isolating the system at normal telephony signal levels.

All components may be surface mounted on a small printed circuit board that piggy-backs onto the original keypad board with the board fitting into the existing plastic controller 25 housing. By integrating the entire system within the hand held controller 25, no external packaging is required.

The schematic diagram of the keypad interface is illustrated in FIG. 3b. The microcontroller 54 is provided by a microcontroller device U3. The date cable 4 connects to a connector J1. The FSK modulator is provided by FSK modulator device U2. The keypad data is translated into asynchronous serial data and output on pin 6 (KEY) of the microcontroller device and connected to the FSK modulator device U2. Potentiometers R2 and R3 tune the mark and space frequencies, and R13 controls the signal amplitude. The modulated FSK signal is sent on line FSKAA to the differential amplifier circuit. The operational amplifiers, U1*a* and U1*b* drive the signal in differential voltage mode through the isolating capacitors C12 and C13. These lines are then connected to the standard tip and ring lines of the telephone network through the power/signalling cable 32 shown in FIG. 1. The 16V AC lines connect to the circuit through connector J2. Diodes D1 and D2 rectify the voltage and voltage regulators U4 and U5 provide the +5V and +12V supplies required by the circuitry.

Figure 4:
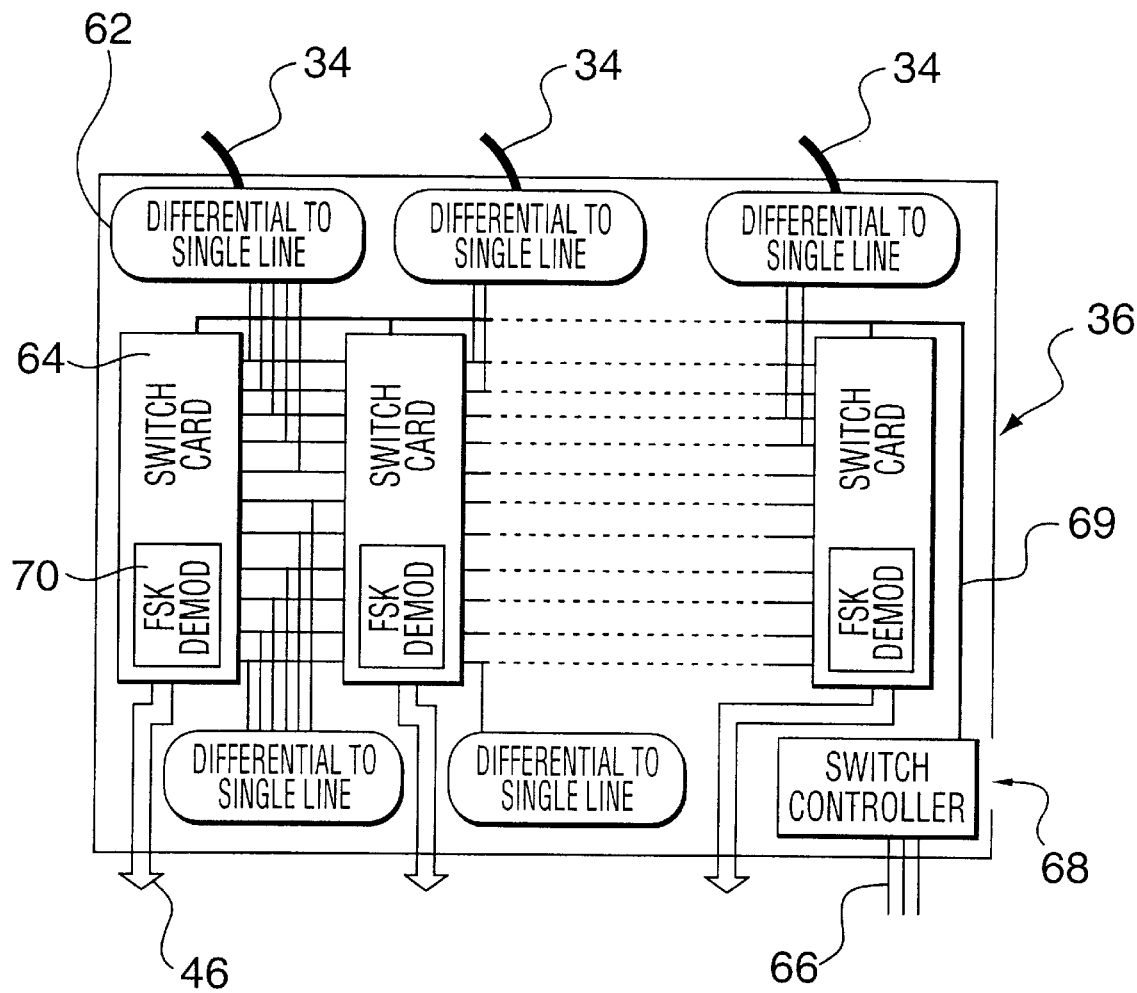
FIG. 4 is a block diagram of a central switch.

Referring to FIG. 4, there is illustrated in a block diagram of the central switch in accordance with an embodiment of the present invention.

The central switch 36 includes a plurality of differential to single line cards 62 for connecting the corresponding plurality of 25-pair cables 34 thereto. The central switch 36 also includes a plurality of analog switches 64 for connecting a selected pair on the input to a particular gateway via a respective bus 46 on the output.

Line 66 connected to a switch controller 68 inputs signals from the order entry system 40 to the switch controller 68. The switch controller 68 is, in turn, connected to the analog switches 64 via a control line 69. Each analog switch 64 includes an FSK demodulator 70 the output of which is connected to the bus 46.

In operation, the central switch 36 routes the de-modulated signal to the allowable gateway 38 allocated by the order entry system 40. The modulated data format tapped from telephone network 24 is routed to the central switch 36 over one of the 25-pair cables 34. Then, the differential to single line card 62, passes the FSK modulated data format, through to the analog switch 64 which is activated by a control signal received on line 69 from a switch controller 68. The FSK demodulator 70 at the output of the analog switch then extracts the game control data and sends this data on the bus 46 to the selected gateway 38.

The system of the present invention, for example, operate as follows: A hotel guest requests connection to the game storage 42 by inputting a game request into the order entry system 40, which may be a computer or an operator. If a gateway 38 is available, the guest's keypad 26 is connected to that gateway 38 through the central switch 36 and the guest's television is tuned to the channel that the gateway modulator 48 is tuned to. The guest's keypad 26 is now connected to the gateway 38 and the guest is prompted by the gateway to select a particular game to play.

Figure 5A:
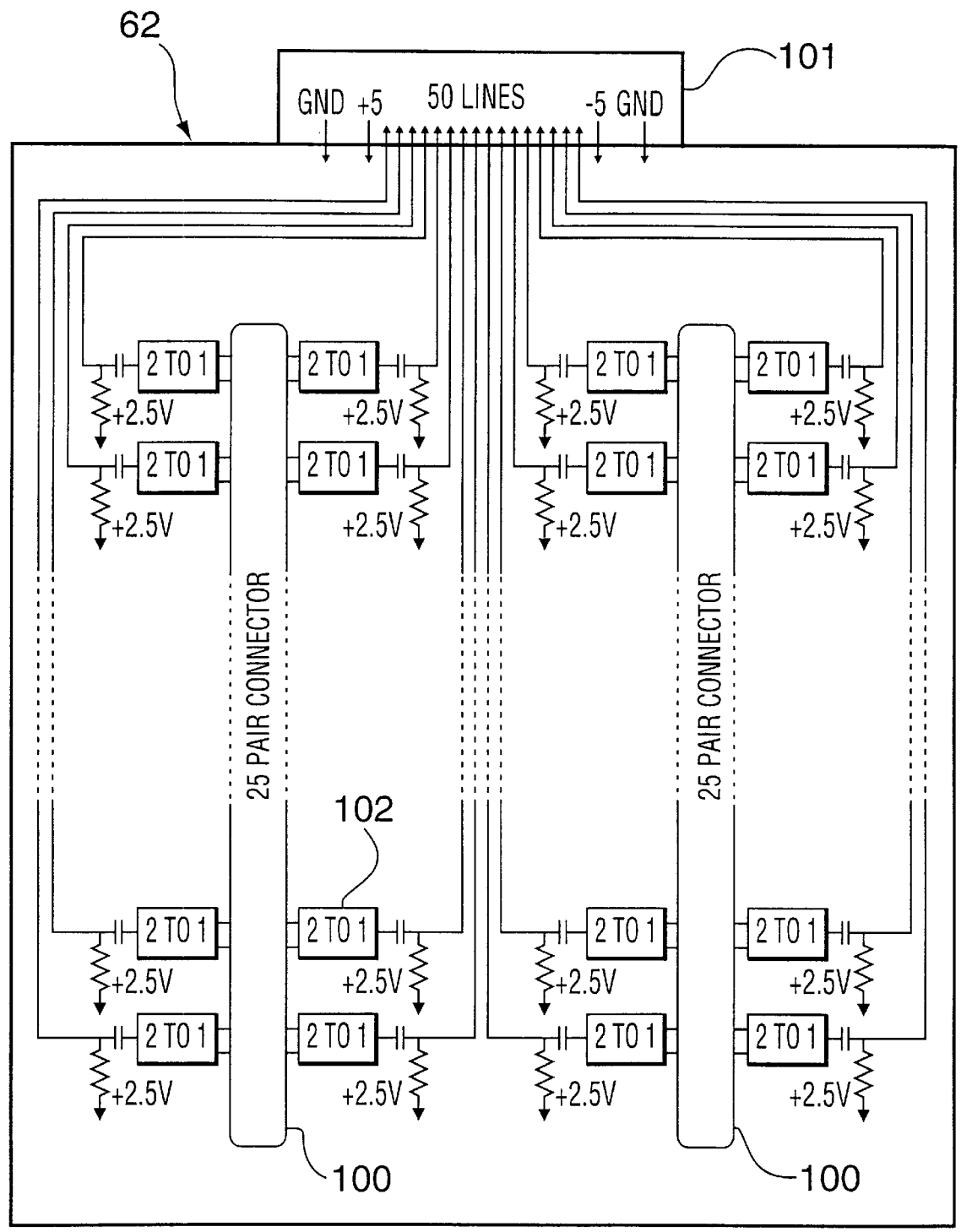
FIG. 5a illustrates, in a block diagram, the differential to single line card of FIG. 4.
Figure 5B:
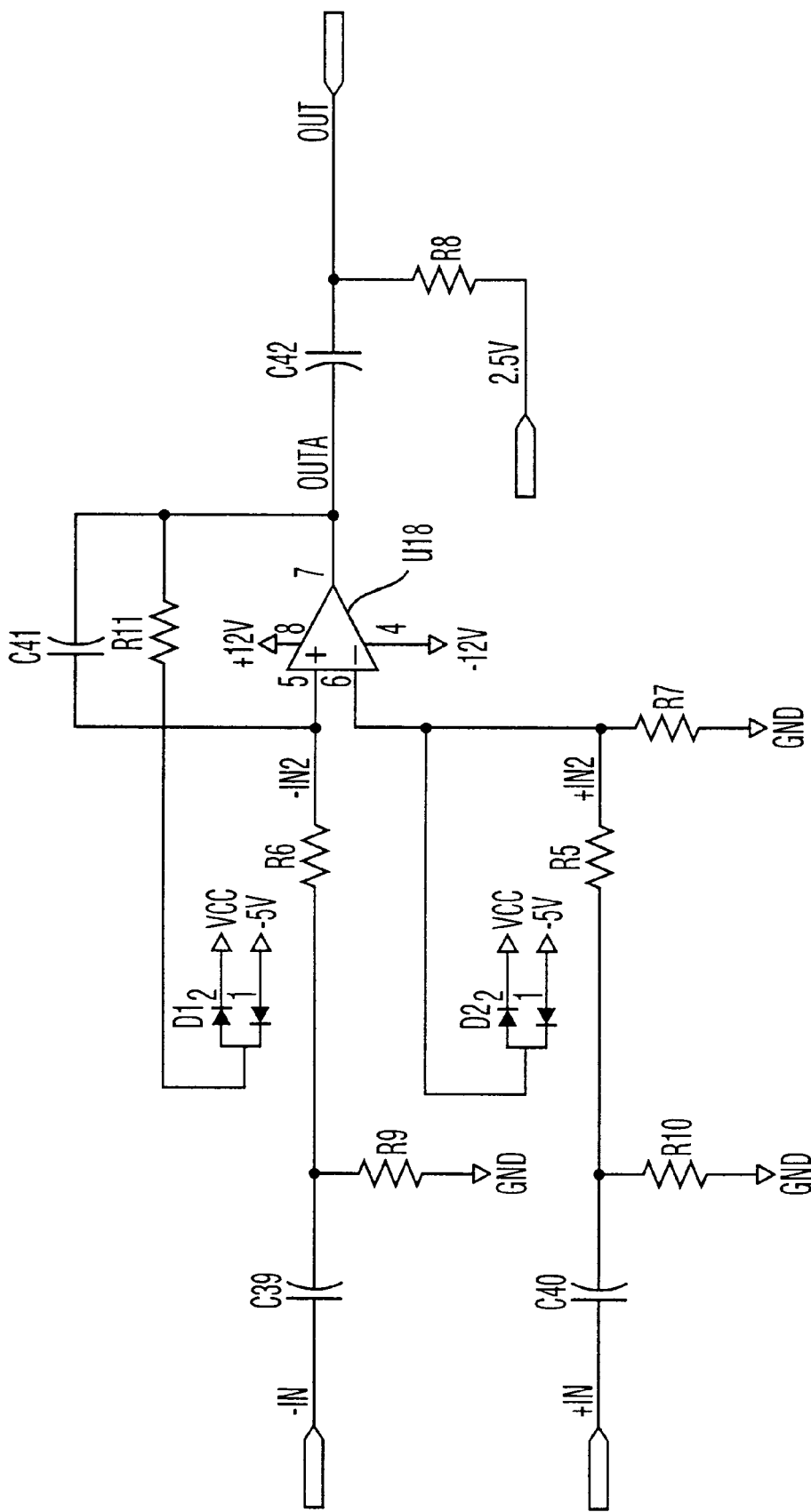

Referring to FIG. 5a, there is illustrated, in a block diagram the differential-to-single line card 62 of FIG. 4. The differential-to-single line card 62 includes two 50-pin input connectors 100 for receiving two 25-pair cables 34 and a card-edge connector 101 having 50 contacts for signals plus power and ground connections. Each pair connected to the input connectors 100 is converted to a single line referred to a potential of +2.5V by a 2 to 1 converter 102, the output of which is capacitively coupled to a respective contact of the card-edge connector 101. Referring to FIG. 5b, there is schematically illustrated, the circuitry connecting an individual pair from the connectors 100 to a contact of card-edge connector 101. The 2 to 1 converter 102 is provided by an operational amplifier U18. Capacitor coupling of the inputs to the operational amplifiers is provided by capacitors C39 and C40.

Figure 6:
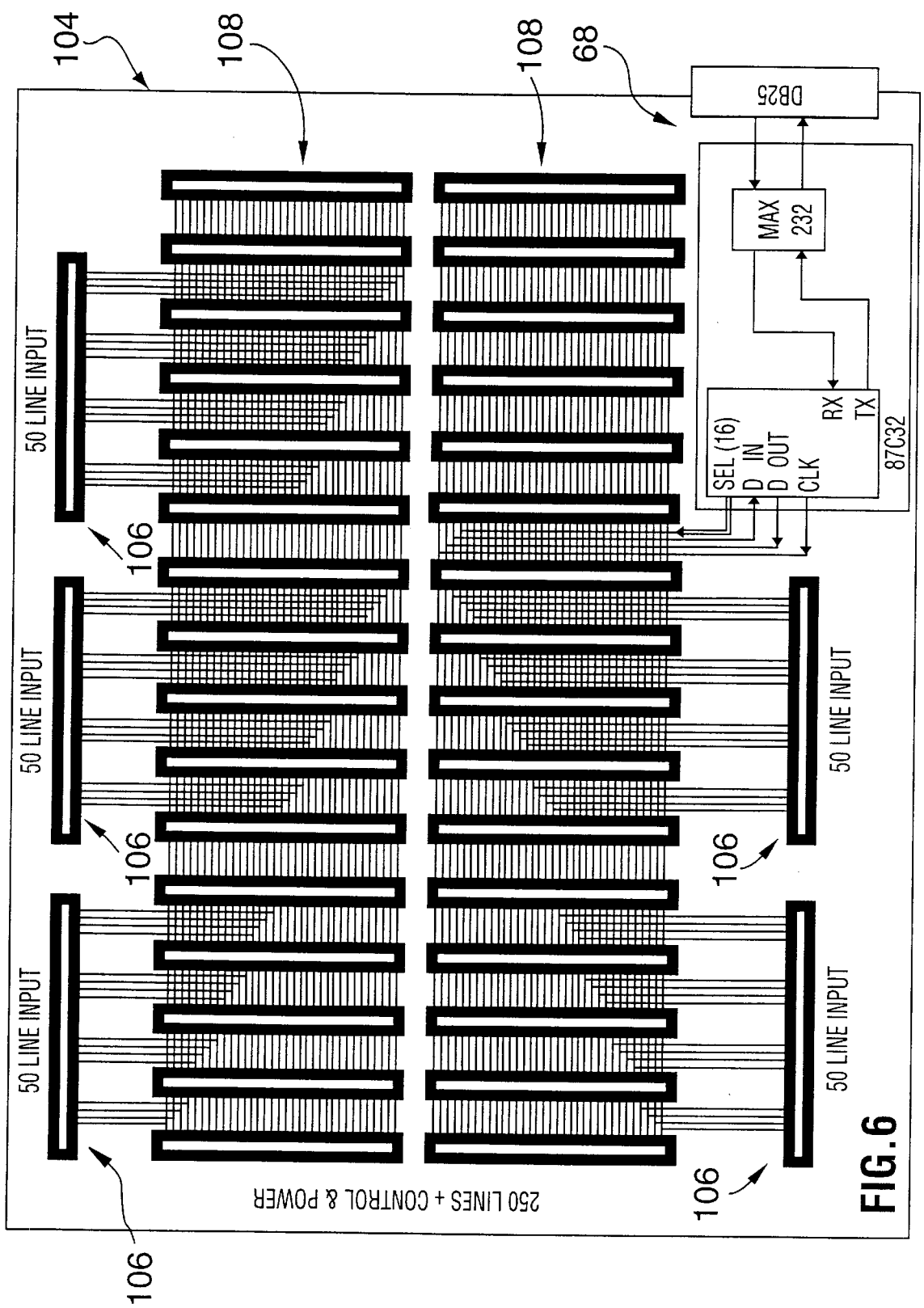
FIG. 6 schematically illustrates a backplane in accordance with an embodiment of the present invention.

Referring to FIG. 6, there is illustrated, in a schematic diagram, a backplane in accordance with an embodiment of the present invention. The backplane 104 includes a plurality of female connectors 108 for receiving the switch cards 64 and a plurality of female connectors 106 for receiving the differential-to-single line cards 62 of FIG. 5a. The backplane 104 includes the switch controller circuit 68 shown in FIG. 4.

FIG. 5b shows the actual circuitry of an individual phone pair. C39 and C40 allow the FSK signal to pass while blocking normal telephone signals. The operational amplifier U18 takes the voltage difference between the two lines and outputs this difference, relative to a +2.5 volt potential, at the point labelled OUT.

In operation, the backplane 104 routes the FSK signals to vertical card-edge connector slots 108 that accept the switch cards 64. The switch controller circuitry 68 that accepts switching commands from an external PC on the line 66, executes the commands by instructing the individual switch cards 64 to connect or disconnect a given FSK signal from its demodulation circuitry 70, and returns the results of the operation to the PC.

Figure 7A:
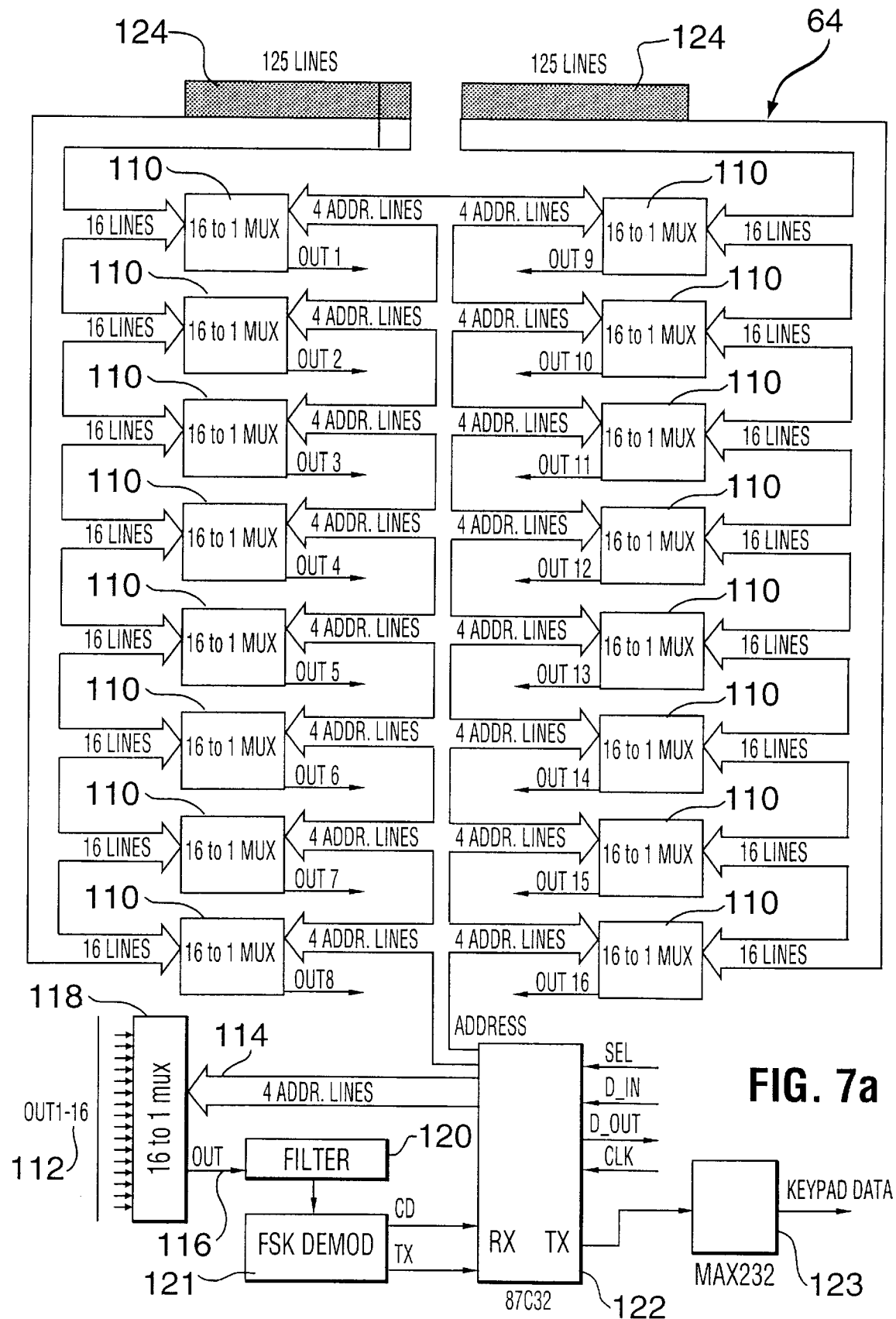
FIG. 7a illustrates, in a block diagram, the switch card of FIG. 6.

Referring to FIG. 7a, there is illustrated, in a block diagram, the switch card of FIG. 4. The switch card 64 includes a plurality of 16 to 1 MUX 110. As shown by MUX 118 for example, each has 16 lines input 112, 4 address lines 114 and an output line 116. Output from each MUX 118, for example passes through a filter 120 and an FSK demodulator 121 that provides a carrier detect signal CD and a demodulated signal to a microprocessor 122 on its RX line. The microprocessor 122 receives SEL, D-IN, and CLK signals from and sends D-OUT signal to the switch controller 68. The demodulator data is provided to an RS232 port 123 for delivery to the associated gateway 38. The 16 to 1 MUX is an available component, for example a 74HC4067 semiconductor device.

Figure 7B:
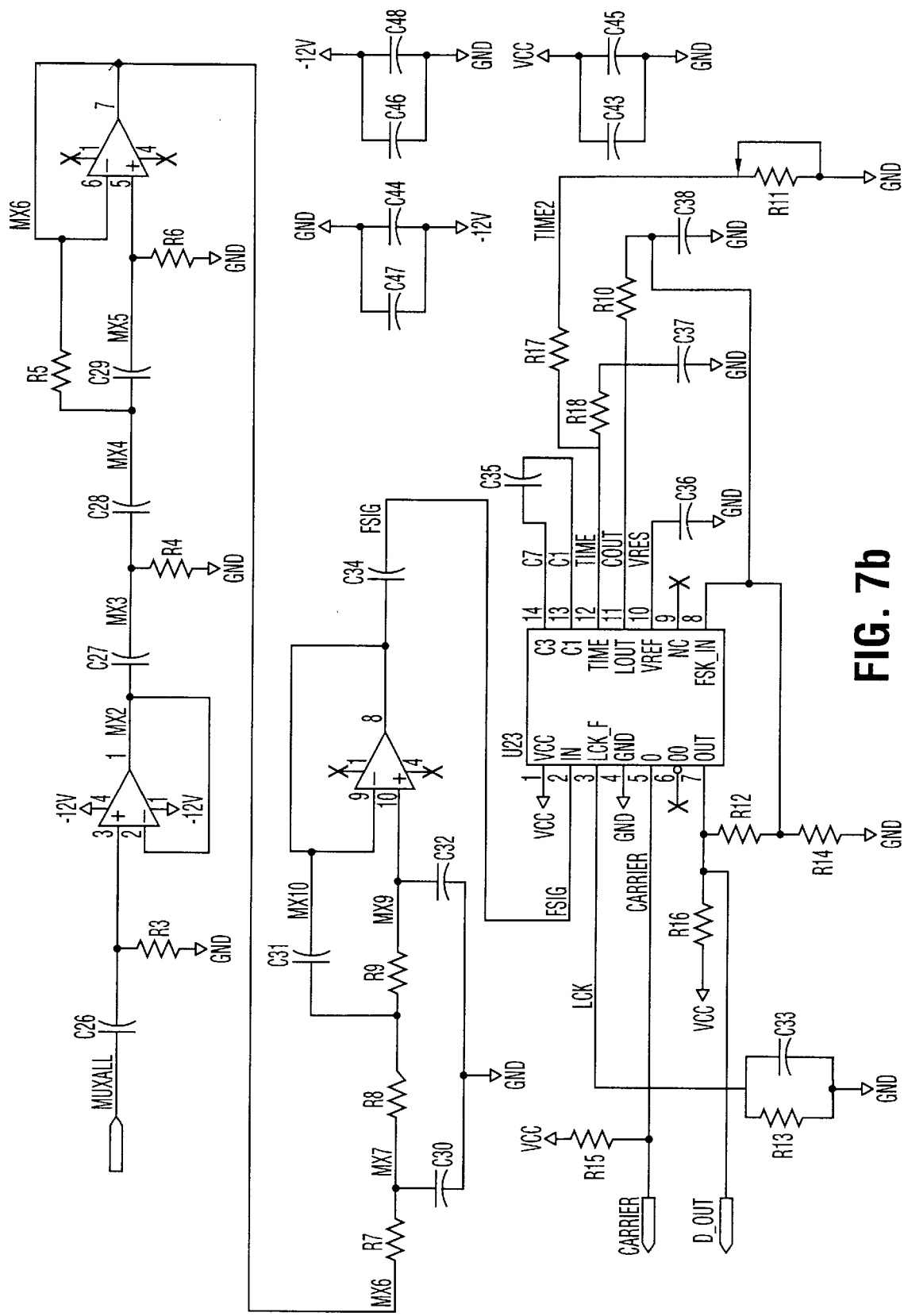

Referring to FIG. 7b, there is schematically illustrated an example of circuitry used to implement the filter 120 and FSK demodulator 121. The operational amplifiers form the filter 120 and U23, an XR-2211, provides the FSK demodulator 121.

The embodiments of the invention in which an exclusive property of privilege is claimed are defined as follows:

1. An apparatus for networking computer games in a centrally located game storage accessed by a remote game keypad comprising:
    a keypad interface for receiving game control data from said keypad, said
    game control data being frequency modulated with a center frequency above the audible frequency range to obtain a modulated data format; and
    means for connecting said keypad interface in parallel across a telephone pair for communicating said modulated data format to a switched telephone network.

2. An apparatus as claimed in claim 1 wherein said keypad interface is placed in the housing of said keypad.

3. An apparatus as claimed in claim 1, wherein said control interface comprises:
    processing means for reading said game control data and encoding said game control data to a serial data format;
    a frequency modulator for modulating said serial data to a modulated data format; and
    an amplifier for amplifying said modulated data format and communicating said modulated data format over said telephone network.

4. An apparatus as claimed in claim 3 further comprising an AC/DC converter for supplying said processing means, said frequency modulator and said amplifier with a stabilized DC voltage.

5. An apparatus as claimed in claim 3, wherein said processing means further comprises means for encoding said game control data for error correction before transmission over said telephone network.

6. An apparatus as claimed in claim 1, in which said switched telephone network, comprises a central switch for receiving said modulated data format, means for extracting said game control data and communicating said data byte to a gateway.

7. An apparatus as claimed in claim 6, wherein said central switch comprises:
    a switch controller for receiving a control signal and establishing an access path for said modulated data format;
    an analog switch for routing said modulated data format along said access path;
    means for demodulating said modulated data format to obtain said game control data and communicating said game control data to said gateway.

8. An apparatus for networking computer games in s centrally located game storage accessed by a remote game keypad comprising:
    a keypad interface for receiving game control data from a keypad, frequency modulating said game control data with a center frequency above the audible frequency range to obtain a modulated data format, said interface including:
    processing means for reading said game control data and encoding said game control data to a serial data format;
    a frequency modulator that modulates said serial data format to a modulated data format;
    an amplifier for amplifying said modulated data format and communicating said modulated data format over said telephone network; and
    an AC/DC converter for supplying said processing means, said frequency modulator and said amplifier with a stabilized DC voltage
    means for connecting said keypad interface in parallel across a telephone pair for communicating said modulated data format to a switched telephone network.

9. A system for networking computer games in a centrally located game storage accessed by a plurality of remote game keypads comprising:
    a plurality of keypad interfaces each for receiving game control data from an associate keypad, frequency modulating said game control data with a center frequency above the audible frequency range to obtain a modulated data format and communicating said modulated data format over a switched telephone network;
    means for receiving said modulated data format over said telephone network, routing said modulated data format along an access path, and extracting said game control data therefrom;
    a central game storage for supplying a game image signal over a television cable network to remote television sets; and
    a plurality of centrally located gateways for receiving said game control data and accordingly transferring game image signals from said game storage over said television cable network.

10. A system as claimed in claim 9 further comprising an order entry system for detecting an available gateway which is free for transferring said game control data from said central switch to said game storage and connecting said access path to said available gateway.

11. A system as claimed in claim 9, further comprising a like plurality of modulators, each associated with a gateway, for receiving a game image signal extracted by said available gateway from said game storage and modulating and transmitting said game over a coaxial cable routed to a television set associated with said keypad interface which has issued said game control data.

12. A system as claimed in claim 9, wherein each of said keypad interface comprises:

processing means for reading said game control data and encoding said game control data to a serial data format;

a frequency modulator that modulates said serial data format to a modulated data format;

an amplifier for amplifying said modulated data format and communicating said modulated data format over said telephone network; and an AC/DC converter for supplying said processing means, said frequency modulator and said amplifier with a stabilized DC voltage.

13. A system as claimed in claim 12, wherein said processing means further comprising means for encoding said game control for error correction before transmission over said telephone network.

14. A system as claimed in claim 9, wherein said means for receiving, routing and extracting is a central switch comprising:

a switch controller for receiving a control signal and establishing an access path for said modulated data format;

an analog switch for routing said modulated data format along said access path;

means for demodulating said modulated data format to obtain said game control data and communicating said game control data to said available gateway.

15. An apparatus as claimed in claim 10, wherein said order entry system comprises:

means for interrogating said plurality of gateways to determine said available gateway; and means for establishing said access path associated to said available gateway.

16. A system for networking computer games using a centrally located game storage accessed with a plurality of remote keypads comprising:

processing means for reading game control data and encoding said game control data to a serial data format;

a frequency modulator that modulates said serial data format with a center frequency above the audible frequency range to obtain a modulated data format;

an amplifier for amplifying said modulated data format and communicating said modulated date format over a switched telephone network;

a switch controller for receiving a control signal and establishing an access path for said modulated data format;

an analog switch for routing said data format along said access path;

means for demodulating said modulated data format to obtain said game control data and communicating said game control data to an available gateway;

means for interrogating said plurality of gateways for determining said available gateway; and means for establishing said access path associated to said available gateway.

17. An apparatus as claimed in claim 16, further comprising means for encoding said game control data for error correction before transmission over said telephone network.

18. An apparatus as claimed in claim 16, further comprising an AC/DC converter for supplying said processing means, said frequency modulator and said amplifier with a stabilized DC voltage.

19. A method for networking computer games in a centrally located game storage accessed by a plurality of remote keypads comprising the steps of:

reading game control data generated by each of said keypads and encoding said game control data to a serial data format;

modulating said serial data format with a center frequency above the audible range to obtain a modulated data format;

amplifying said modulated data format and communicating said modulated data format over a switched telephone network;

establishing an access path for said modulated data format;

routing said data format along said access path;

interrogating said plurality of gateways for determining an available gateway; and demodulating said modulated data format and communicating said game control data to said available gateway.

* * * * *